United States Patent
Shen

(10) Patent No.: US 9,690,341 B2
(45) Date of Patent: Jun. 27, 2017

(54) HEAT INSULATION STRUCTURE FOR HAND-HELD DEVICE AND HAND-HELD DEVICE WITH SAME

(71) Applicant: ASIA VITAL COMPONENTS CO., LTD., New Taipei (TW)

(72) Inventor: Ching-Hang Shen, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 0 days.

(21) Appl. No.: 14/845,275

(22) Filed: Sep. 4, 2015

(65) Prior Publication Data
US 2017/0068278 A1    Mar. 9, 2017

(51) Int. Cl.
| H05K 7/20 | (2006.01) |
| G06F 1/20 | (2006.01) |
| G06F 1/16 | (2006.01) |
| H05K 5/02 | (2006.01) |

(52) U.S. Cl.
CPC ............ *G06F 1/206* (2013.01); *G06F 1/1635* (2013.01); *G06F 1/1637* (2013.01); *G06F 1/1656* (2013.01); *G06F 1/1658* (2013.01); *G06F 1/203* (2013.01); *H05K 5/0213* (2013.01)

(58) Field of Classification Search
CPC .... G06F 1/1656; G06F 1/1635; G06F 1/1637; G06F 1/1658; G06F 1/206; G06F 1/203; H05K 5/0213

USPC .......................................................... 361/714
See application file for complete search history.

(56) References Cited

U.S. PATENT DOCUMENTS

| 7,833,605 B2* | 11/2010 | Tenra | E04B 1/803 |
| | | | 428/69 |
| 2007/0115644 A1* | 5/2007 | Kim | G06F 1/1626 |
| | | | 361/720 |
| 2014/0369000 A1* | 12/2014 | Kim | H01L 23/473 |
| | | | 361/689 |
| 2016/0270205 A1* | 9/2016 | Kamimura | H05K 1/0203 |
| 2016/0274624 A1* | 9/2016 | North | G06F 1/203 |

FOREIGN PATENT DOCUMENTS

CN       EP 2075993 A1 *  7/2009  ............. G06F 1/203

* cited by examiner

*Primary Examiner* — Nidhi Thaker

(57) ABSTRACT

A heat insulation structure for hand-held device includes a holding body disposed in a hand-held device. The holding body has a frame and internally defines a receiving space, in which a holding section is provided. A heat insulation space is formed between the frame and the holding section. The frame and the holding section are connected to each other via at least one connecting member. With the heat insulation space formed between the frame and the holding section, the heat insulation structure for hand-held device provides effective heat dissipation effect to prevent a hand-held device from burning a user's hand due to heat produced by electronic elements in the had-held device.

12 Claims, 6 Drawing Sheets

HEAT INSULATION STRUCTURE FOR HAND-HELD DEVICE AND HAND-HELD DEVICE WITH SAME

FIELD OF THE INVENTION

The present invention relates to a heat insulation structure for hand-held device, and more specifically, to a heat insulation structure for hand-held device capable of effectively preventing a hand-held device from burning a user's hand due to heat produced by electronic elements in the hand-held device. The present invention also relates to a hand-held device with such heat insulation structure.

BACKGROUND OF THE INVENTION

Most of the currently available mobile devices, such as notebook computers, tablet computers and smartphones, have a slim body and a largely increased computing speed. The electronic elements in the mobile devices for executing the computation at high speed also produce a large amount of heat during operation thereof. For the purpose of being conveniently portable, the mobile devices have a largely reduced overall thickness. And, to prevent invasion by foreign matters and moisture, the mobile devices are provided with only an earphone port and some necessary connection ports but not other open holes that allow air convection between the narrow internal space of the mobile devices and the external environment. Therefore, due to the small thickness of the mobile devices, the large amount of heat produced by the electronic elements in the mobile devices, such as the computation executing units and the battery, can not be quickly dissipated into the external environment. Further, due to the closed narrow internal space of the mobile devices, it is difficult for the heat produced by the electronic elements to dissipate through air convection. As a result, heat tends to accumulate or gather in the mobile devices to adversely affect the working efficiency or even cause crash of the mobile devices.

To solve the above problems, some passive type heat dissipation elements, such as heat spreader, vapor chamber, heat sink, etc., are mounted in the hand-held devices to assist in heat dissipation thereof. However, while these passive type heat dissipation elements directly transfer the internally accumulated heat to an outer case, frame or body of the hand-held or the mobile device for dissipation, the rising temperature at the above areas of the hand-held or the mobile device tend to burn a user's hand or face that is in contact with the heated areas, such as the frame or two lateral sides of the hand-held or the mobile device, and therefore causes inconvenience in using the devices.

Therefore, it is important to design and develop a heat insulation structure for hand-held device that provides effective heat dissipation effect to prevent a hand-held device from burning a user's hand due to heat produced by electronic elements in the hand-held device.

SUMMARY OF THE INVENTION

To solve the above and other problems, a primary object of the present invention is to provide a heat insulation structure for hand-held device that provides effective heat dissipation effect to prevent the hand-held device from burning a user's hand. Another object of the present invention is to provide a hand-held device with such heat insulation structure.

To achieve the above and other objects, the heat insulation structure for hand-held device according to the present invention includes a holding body. The holding body has a frame and internally defines a receiving space, in which a holding section is provided. A heat insulation space is formed between the frame and the holding section. The frame and the holding section are connected to each other via at least one connecting member.

To achieve the above and other objects, the hand-held device with heat insulation structure according to an embodiment of the present invention includes a holding body, a plurality of electronic elements, and a display module.

The holding body has a frame and internally defines a receiving space, in which a holding section is provided. A heat insulation space is formed between the frame and the holding section. The frame and the holding section are connected to each other via at least one connecting member.

The electronic elements are correspondingly located in the receiving space and mounted on the holding section. The display module is correspondingly covered onto the receiving space to close the receiving space.

To achieve the above and other objects, the hand-held device with heat insulation structure according to another embodiment of the present invention includes a holding body, a plurality of electronic elements, a display module, a battery unit, and a back cover.

The holding body has a frame and internally defines a receiving space, in which a holding section is provided. A heat insulation space is formed between the frame and the holding section. The frame and the holding section are connected to each other via at least one connecting member. The holding section defines the receiving space into a first and a second receiving section.

The electronic elements are correspondingly located in the first receiving section and mounted on one side of the holding section oriented to the receiving space. The display module is correspondingly covered onto the first receiving section to close the first receiving section. The battery unit is located in the second receiving section and mounted on the other side of the holding section facing toward the second receiving section, whereas the back cover is correspondingly covered onto the second receiving section to close the second receiving section.

With these arrangements, the heat insulation structure for hand-held device that can effectively dissipate heat produced by electronic elements mounted on the receiving space and therefore prevents a hand-held device from burning a user's hand in using the hand-held device without any inconvenience.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
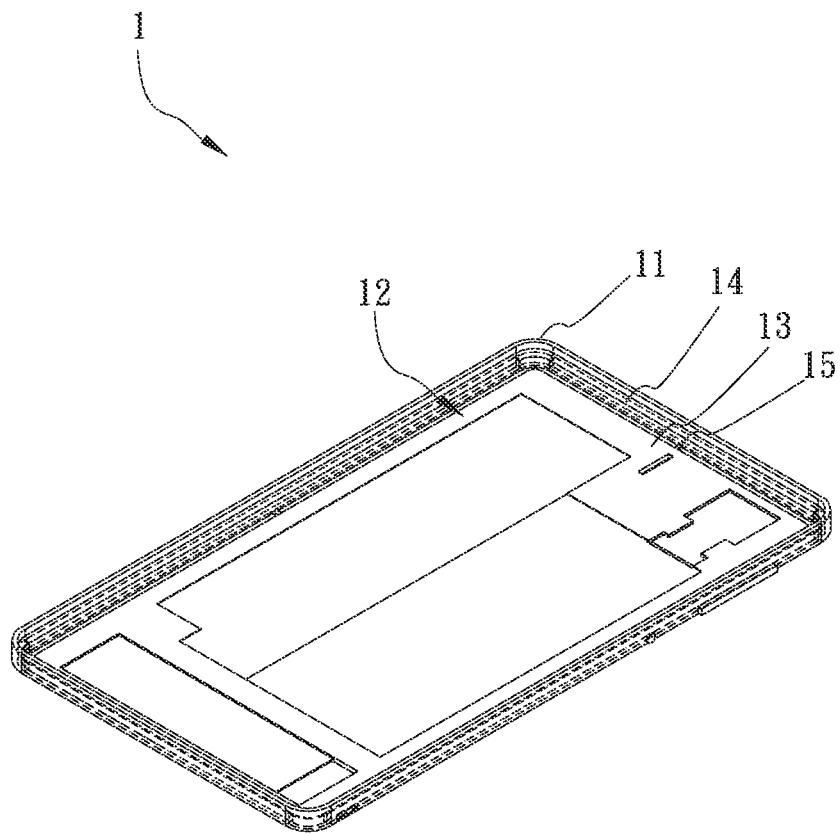
FIG. 1 is an assembled perspective view of a heat insulation structure for hand-held device according to a first embodiment of the present invention.

The present invention will now be described with some preferred embodiments thereof and by referring to the accompanying drawings. For the purpose of easy to understand, elements that are the same in the preferred embodiments are denoted by the same reference numerals.

Figure 2:
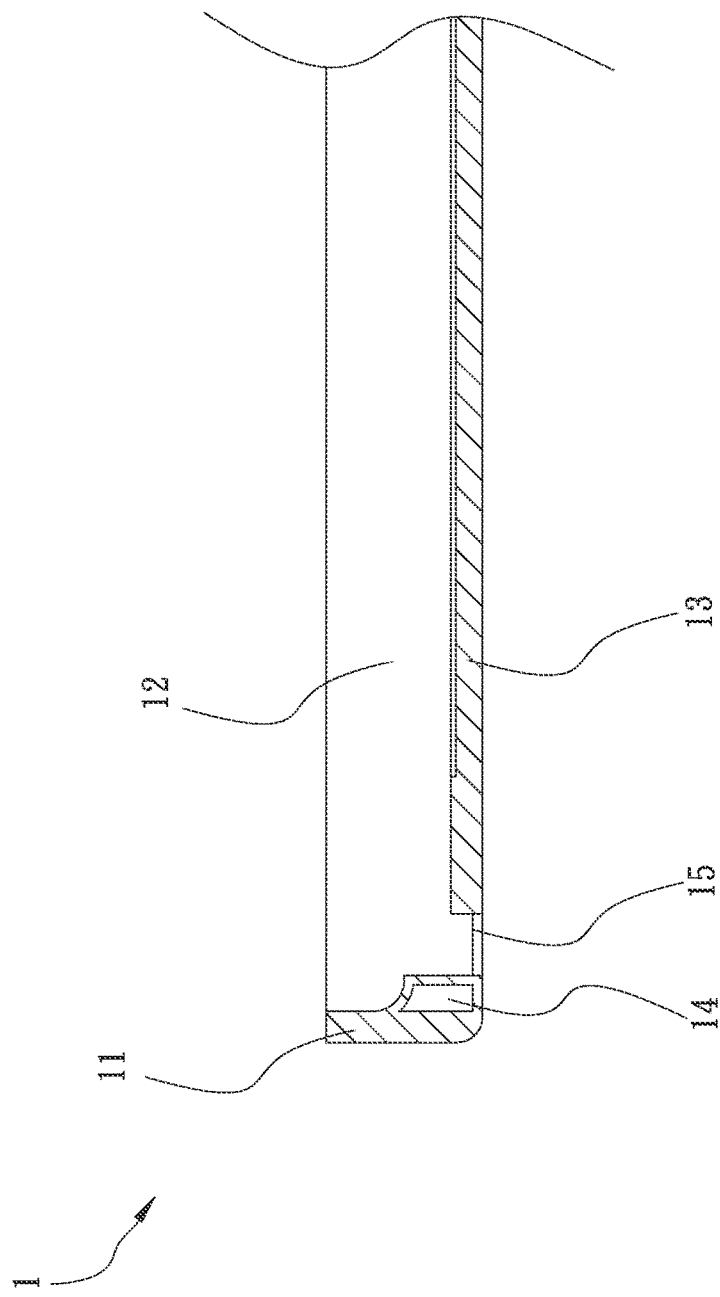
FIG. 2 is a fragmentary, sectional view of FIG. 1.

Please refer to FIG. 1, which is an assembled perspective view of a heat insulation structure for hand-held device according to a first embodiment of the present invention, and to FIG. 2, which is a fragmentary, assembled sectional view of FIG. 1. As shown, the heat insulation structure includes a holding body 1.

The holding body 1 has a frame 11 and internally defines a receiving space 12, in which a holding section 13 is provided. A heat insulation space 14 is formed between the frame 11 and the holding section 13. The frame 11 and the holding section 13 are connected to each other via at least one connecting member 15, which is not a good heat conductor.

Due to no heat transfer medium existing, the heat insulation space 14 is vacuum or non-vacuum. With the vacuum heat insulation space 14 formed between the frame 11 and the holding section 13, the heat produced by the electronic elements 2 is prevented from being transferred to the frame 11, so as to prevent the hand-held device from burning a user's hand or inconvenience in using the hand-held device.

The frame 11 is located around the receiving space 12 and perpendicular to the holding section 13. That is, the frame 11 is in contact with a user's hand when using the hand-held device, whereas the heat produced by the electronic elements is absorbed and transferred to the holding section 13 and then dissipated into the surrounding environment via the holding section 13.

In the illustrated first embodiment, the holding section 13 is made of a metal plate, a plastic plate, or a combination thereof, and is provided on a bottom of the receiving space 12. The electronic elements 2 are mounted on the holding section 13, which absorbs and transfers the heat produced by the electronic elements, and can be a display module, a battery, or a printed circuit board (PCB).

One side of the holding section 13 oriented to the receiving space 12 absorbs and transfers the heat produced by the electronic elements 2 to the other side of the holding section 13 opposite to the receiving space 12 for dissipating into the surrounding environment. The frame 11 is in contact with a user's hand when using the hand-held device, whereas the heat produced by the electronic elements is absorbed and transferred to the holding section 13 and then dissipated into the surrounding environment via the holding section 13.

Figure 3:
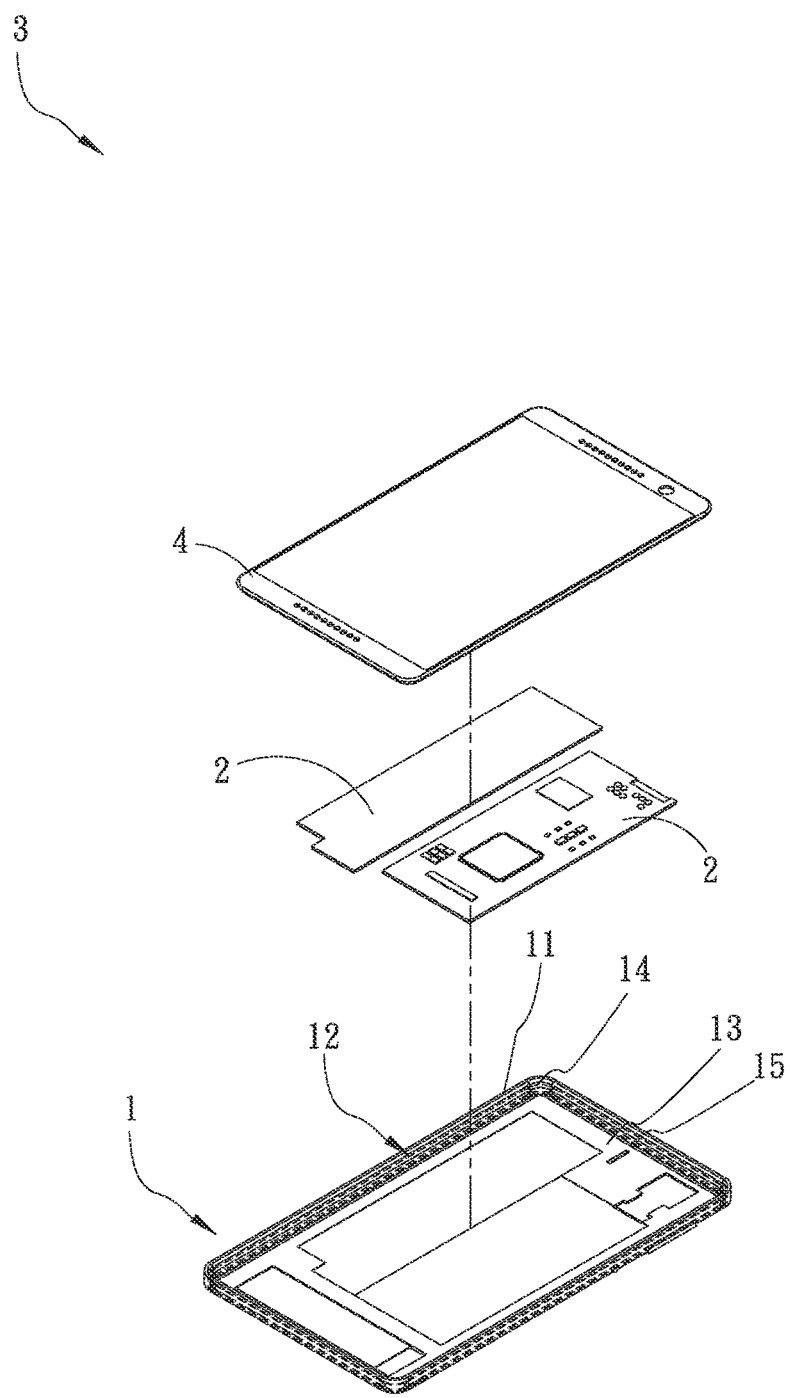
FIG. 3 is an exploded perspective view of a hand-held device with the heat insulation structure according to a first embodiment of the present invention.
Figure 4:
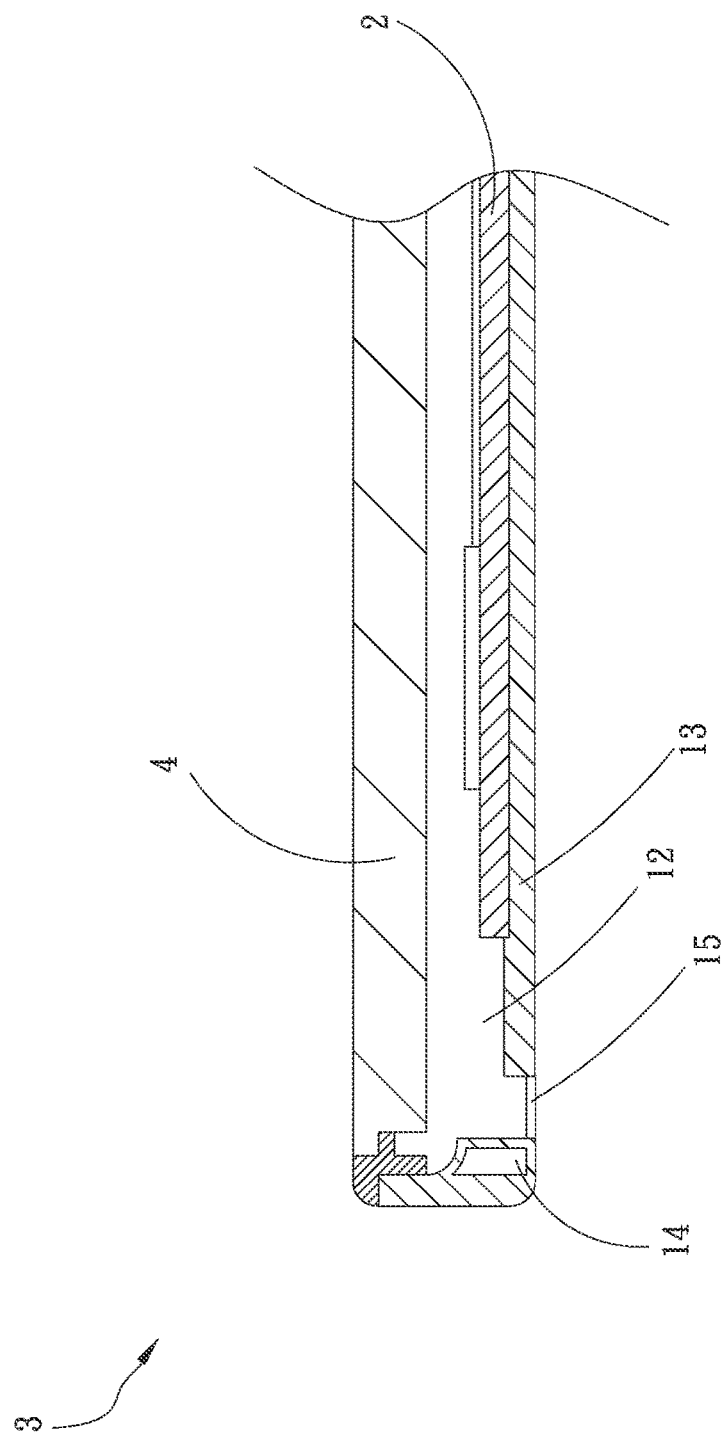
FIG. 4 is a fragmentary, assembled sectional view of FIG. 3.

Please refer to FIG. 3, which is an exploded perspective view of a hand-held device with the heat insulation structure for hand-held device according to a first embodiment of the present invention, and to FIG. 4, which is a fragmentary, assembled sectional view of FIG. 3. The heat insulation structure for hand-held device included in the first embodiment is generally structurally similar to that in other embodiments. As shown, the hand-held device with the heat insulation structure 3 includes a holding body 1, a plurality of electronic elements 2, and a display module 4.

The holding body 1 has a frame 11 and internally defines a receiving space 12, in which a holding section 13 is provided. A heat insulation space 14 is formed between the frame 11 and the holding section 13. The frame 11 and the holding section 13 are connected to each other via at least one connecting member 15.

The electronic elements 2 are correspondingly located in the receiving space 12 and mounted on the holding section 13. The electronic elements 2 can include a PCB, at least one camera, a flash memory card, and so on. Since the electronic elements 2 are mounted on one side of the holding section 13 oriented to the receiving space 12 to locate in the receiving space 12, when the electronic elements 2 produce heat, the produced heat is directly transferred to the holding section 13 of the holding body 1 to dissipate into the surrounding environment through heat radiation. With the vacuum heat insulation space 14 formed between the frame 11 and the holding section 13, the heat produced by the electronic elements 2 is prevented from being transferred to the frame 11, so as to prevent the hand-held device from burning a user's hand or inconvenience in using the hand-held device.

The display module 4 is correspondingly covered onto the receiving space 12 to close the receiving space 12, and has one side located in the receiving space 12.

Figure 5:
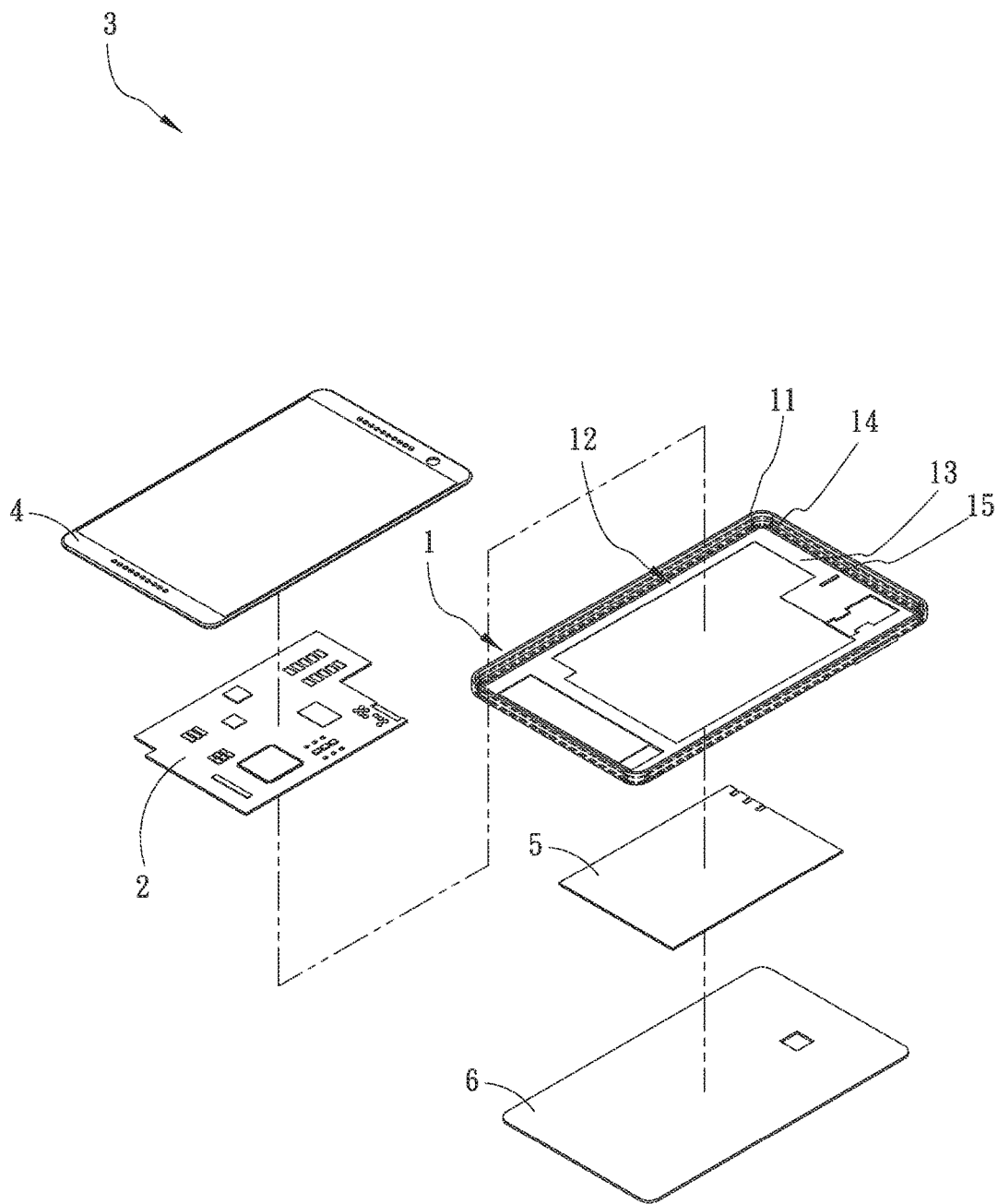
FIG. 5 is an exploded perspective view of the hand-held device with the heat insulation structure according to a second embodiment of the present invention.
Figure 6:
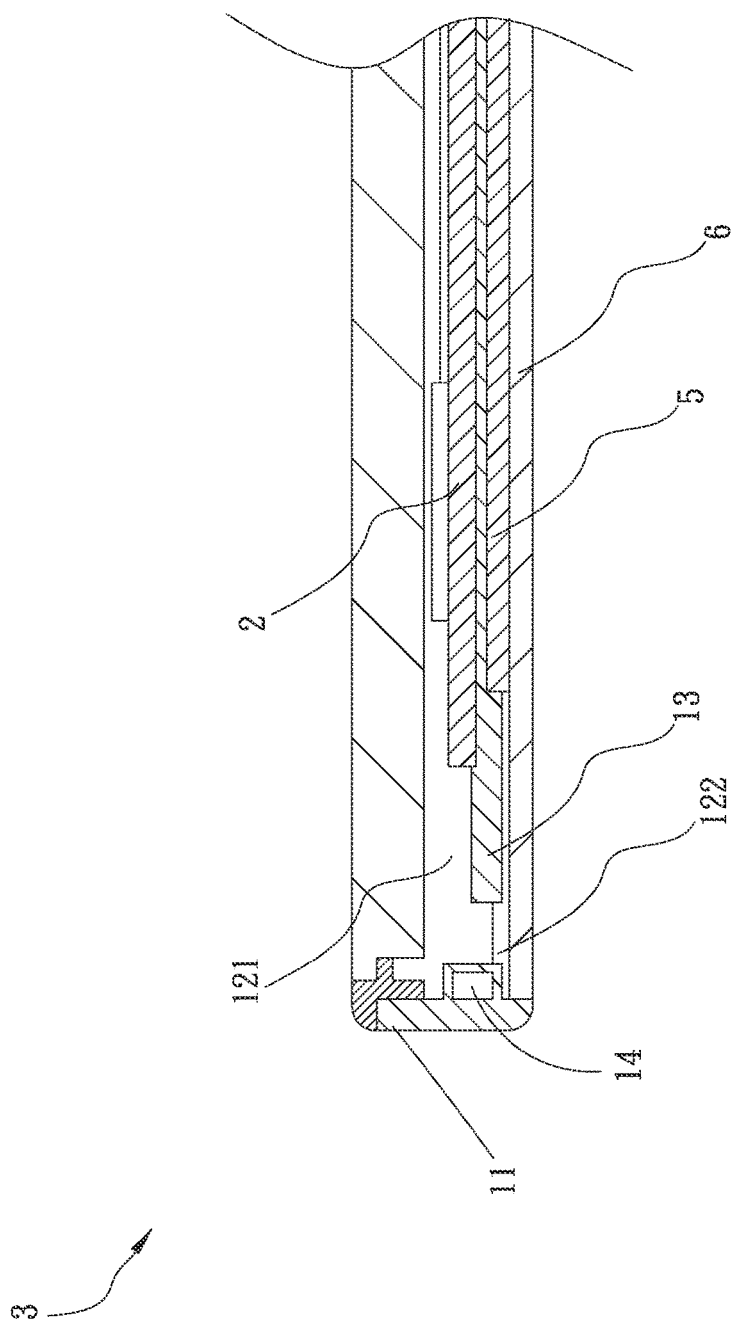
FIG. 6 is a fragmentary, assembled sectional view of FIG. 5.

Please refer to FIG. 5, which is an exploded perspective view of the hand-held device with the heat insulation structure for hand-held device according to a second embodiment of the present invention, and to FIG. 6, which is a fragmentary, assembled sectional view of FIG. 5. The second embodiment of the hand-held device with the heat insulation structure for hand-held device of the present invention is generally structurally similar to the first embodiment. As shown, the hand-held device 3 includes a holding body 1, a plurality of electronic elements 2, a display module, a battery unit 5, and a back cover 6.

The holding body 1 has a frame 11 and internally defines a receiving space 12, in which a holding section 13 is provided. A heat insulation space 14 is formed between the frame 11 and the holding section 13. The frame 11 and the holding section 13 are connected to each other via at least one connecting member 15. The holding section 13 defines the receiving space 12 into a first and a second receiving section 121, 122.

The electronic elements 2 are correspondingly located in the first receiving section 121 and mounted on one side of the holding section 13. The electronic elements 2 can include a PCB, at least one camera, a flash memory card, and so on. The electronic elements 2 are mounted on one side of the holding section 13 to fixedly located in the first receiving section 121, whereas the display module 4 is correspondingly covered onto the first receiving section 121 to close the first receiving section 121 and connect to the holding body 1.

The battery unit 5 is located in the second receiving section 122 and mounted on the other side of the holding section 13 opposite to the first receiving section 121 whereas the back cover 6 is correspondingly covered onto the second receiving section 122 to close an open side of the second receiving section 122.

With the heat insulation space 14 provided between the frame 11 in contact with a user's hand and the holding section 13 for the electronic elements 2 to be mounted on the holding section 13, the heat produced by the electronic elements 2 is prevented from being transferred to the frame 11 and absorbed and transferred to the holding section 13 of the holding body 1 to dissipate into the surrounding environment through heat radiation, so as to prevent the hand-held device from burning a user's hand or inconvenience in using the hand-held device.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A heat insulation structure for a hand-held device, comprising: a holding body having a frame internally defining a receiving space, a holding section provided in the receiving space wherein the frame is located around the receiving space and extends perpendicularly to the holding section; a heat insulation space formed between the frame and the holding section so as to extend completely around an outer periphery of the holding section; and at least one connecting member connecting the frame and the holding section; wherein the heat insulation space is either vacuum or non-vacuum; and wherein the at least one connecting member extends completely around the outer periphery of the holding section.

2. The heat insulation structure as claimed in claim 1, wherein the holding section is selected from the group consisting of a metal plate and a plastic plate.

3. The heat insulation structure as claimed in claim 1, wherein the connecting section is not a good heat conductor.

4. The heat insulation structure for a hand-held device of claim 1, wherein the at least one connecting member is interposed between the frame and the holding section in a plane of the holding section.

5. A hand-held device with a heat insulation structure, comprising: a holding body having a frame internally defining a receiving space, a holding section provided in the receiving space wherein the frame is located around the receiving space and extends perpendicularly to the holding section; a heat insulation space formed between the frame and the holding section so as to extend completely around an outer periphery of the holding section; at least one connecting member connecting the frame and the holding section; a plurality of electronic elements being correspondingly located in the receiving space and mounted on the holding section; and a display module being correspondingly covered onto the receiving space to close the receiving space; wherein the heat insulation space is either vacuum or non-vacuum; and wherein the at least one connecting member extends completely around the outer periphery of the holding section.

6. The hand-held device as claimed in claim 5, wherein the holding section is selected from the group consisting of a metal plate and a plastic plate.

7. The hand-held device as claimed in claim 5, wherein the connecting section is not a good heat conductor.

8. The hand-held device as claimed in claim 5, wherein the holding section is provided on a bottom of the receiving space.

9. A hand-held device with a heat insulation structure, comprising: a holding body having a frame internally defining a receiving space, a holding section provided in the receiving space wherein the frame is located around the receiving space and extends perpendicularly to the holding section; a heat insulation space formed between the frame and the holding section so as to extend completely around an outer periphery of the holding section; at least one connecting member connecting the frame and the holding section, and the holding section defining the receiving space into a first and a second receiving section; a plurality of electronic elements being correspondingly located in the receiving space and mounted on one side of the holding section; and a display module being correspondingly covered on the first receiving section to close the first receiving section; a battery unit being located in the second receiving section and mounted on the other side of the holding section opposite to the first receiving section; and a back cover being correspondingly covered onto the second receiving section to close the second receiving section; wherein the heat insulation space is either vacuum or non-vacuum; and wherein the at least one connecting member extends completely around the outer periphery of the holding section.

10. The hand-held device as claimed in claim 9, wherein the holding section is selected from the group consisting of a metal plate and a plastic plate.

11. The hand-held device as claimed in claim 9, wherein the connecting section is not a good heat conductor.

12. The hand-held device as claimed in claim 9, wherein the holding section is provided on a bottom of the receiving space.

* * * * *